(12) United States Patent
Kuroda et al.

(10) Patent No.: US 11,795,846 B2
(45) Date of Patent: Oct. 24, 2023

(54) INTERNAL COMBUSTION ENGINE

(71) Applicant: HONDA MOTOR CO., LTD., Tokyo (JP)

(72) Inventors: Tatsuya Kuroda, Wako (JP); Hiroki Tawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/775,335

(22) PCT Filed: Nov. 12, 2019

(86) PCT No.: PCT/JP2019/044253
§ 371 (c)(1),
(2) Date: May 9, 2022

(87) PCT Pub. No.: WO2021/095111
PCT Pub. Date: May 20, 2021

(65) Prior Publication Data
US 2022/0389847 A1 Dec. 8, 2022

(51) Int. Cl.
*F01M 13/04* (2006.01)
*F02M 35/10* (2006.01)

(52) U.S. Cl.
CPC ...... *F01M 13/04* (2013.01); *F02M 35/10209* (2013.01)

(58) Field of Classification Search
CPC .......... F01M 13/04; F01M 13/022; F01M 2013/0038; F01M 13/00; F02M 35/10209
See application file for complete search history.

(56) References Cited

U.S. PATENT DOCUMENTS

| 5,778,847 | A | * | 7/1998 | Takahashi | B63H 20/28 440/88 L |
| 5,904,604 | A | * | 5/1999 | Suzuki | B63J 3/02 123/195 P |
| 6,450,847 | B1 | * | 9/2002 | Kashima | F02M 35/10085 440/88 R |
| 6,516,768 | B1 | * | 2/2003 | Watanabe | F02M 35/10085 123/573 |

(Continued)

FOREIGN PATENT DOCUMENTS

| CA | 2371648 | C | * | 5/2007 | ............ F02B 61/045 |
| DE | 102004013763 | A1 | * | 10/2005 | ............ F01M 13/04 |

(Continued)

OTHER PUBLICATIONS

International Search Report and Written Opinion for International Application No. PCT/JP2019/044253 dated Jan. 7, 2020, 9 pages.

*Primary Examiner* — Hung Q Nguyen
(74) *Attorney, Agent, or Firm* — AMIN, TUROCY & WATSON, LLP (57) ABSTRACT

An internal combustion engine is provided with: two intake pipe portions for guiding intake air to two banks; and a blow-by gas recirculation pathway for leading blow-by gas to the two intake pipe portions from a cylinder head or a crank case that includes the two banks. The blow-by gas recirculation pathway includes a distribution passage which is provided between the two intake pipe portions, and which distributes the blow-by gas and allows the same to flow to the two intake pipe portions.

16 Claims, 8 Drawing Sheets

(56) References Cited

U.S. PATENT DOCUMENTS

2011/0088641 A1    4/2011  Shudo et al.

FOREIGN PATENT DOCUMENTS

| JP | 2706955 B2 | * | 1/1998 | |
|----|------------|---|--------|---|
| JP | 2002-030916 |  | 1/2002 | |
| JP | 2011-085118 |  | 4/2011 | |
| JP | 2012127357 A | * | 7/2012 | ....... F02M 35/10295 |

* cited by examiner

INTERNAL COMBUSTION ENGINE

TECHNICAL FIELD

The present invention relates to an internal combustion engine including two intake pipe portions that guide intake air to two banks, and a blow-by gas recirculation path that guides blow-by gas from a cylinder head including two banks or from a crankcase to the two intake pipe portions.

BACKGROUND ART

For example, JP 2011-085118 A discloses that, when gas in a combustion chamber flows into a crank chamber through a gap between a cylinder and a piston as blow-by gas, the blow-by gas is returned to the combustion chamber by being recirculated from the crank chamber to an intake path via a blow-by gas recirculation path.

SUMMARY OF THE INVENTION

In a V-type engine (internal combustion engine), intake air may be guided from two intake paths (intake pipe portions) to two banks. In this case, the technique of the blow-by gas recirculation path of an internal combustion engine in which intake air is guided from one intake pipe portion to one bank cannot be applied as it is.

That is, in the internal combustion engine in which intake air is guided from one intake pipe portion to one bank, (1) blow-by gas is recirculated to a silencer provided on the upstream side of a throttle in the intake pipe portion, or (2) the blow-by gas is recirculated to a connecting member such as a grommet that connects the throttle and the silencer. When these techniques are applied to an internal combustion engine in which intake air is guided from two intake pipe portions to two banks, in the case of (1), blow-by gas is likely to be recirculated to one intake pipe portion depending on a position where blow-by gas is recirculated. This causes a combustion difference in the cylinder between the two banks. As a result, the performance of the internal combustion engine may be decreased. In the case of (2), cost and weight may increase from the viewpoint of an increase in the number of components and an arrangement layout.

The present invention has been made in consideration of such a problem, and an object thereof is to provide an internal combustion engine that can suppress the occurrence of a combustion difference in a cylinder between two banks and can achieve cost reduction and weight reduction with a compact configuration.

According to an aspect of the present invention, there is provided an internal combustion engine comprising: two intake pipe portions configured to guide intake air to two banks; and a blow-by gas recirculation path configured to guide blow-by gas from a cylinder head including the two banks or from a crankcase to the two intake pipe portions, wherein the blow-by gas recirculation path includes a distribution passage provided between the two intake pipe portions and configured to allow the blow-by gas to be distributed to flow into the two intake pipe portions.

According to the present invention, the blow-by gas can be uniformly distributed to flow into the two banks from the distribution passage via the two intake pipe portions. As a result, occurrence of a combustion difference in the cylinder between the two banks is suppressed, and the performance of the internal combustion engine can be improved. Further, by providing the distribution passage between the two intake pipe portions, it is possible to compactly arrange the blow-by gas recirculation path. As a result, cost reduction and weight reduction of the internal combustion engine can be achieved.

DESCRIPTION OF THE INVENTION

Hereinafter, a preferred embodiment of an internal combustion engine according to the present invention will be illustrated and described in an exemplary manner with reference to the accompanying drawings.

1. Schematic Configuration of Outboard Motor 12 Including Engine 10

Figure 1:
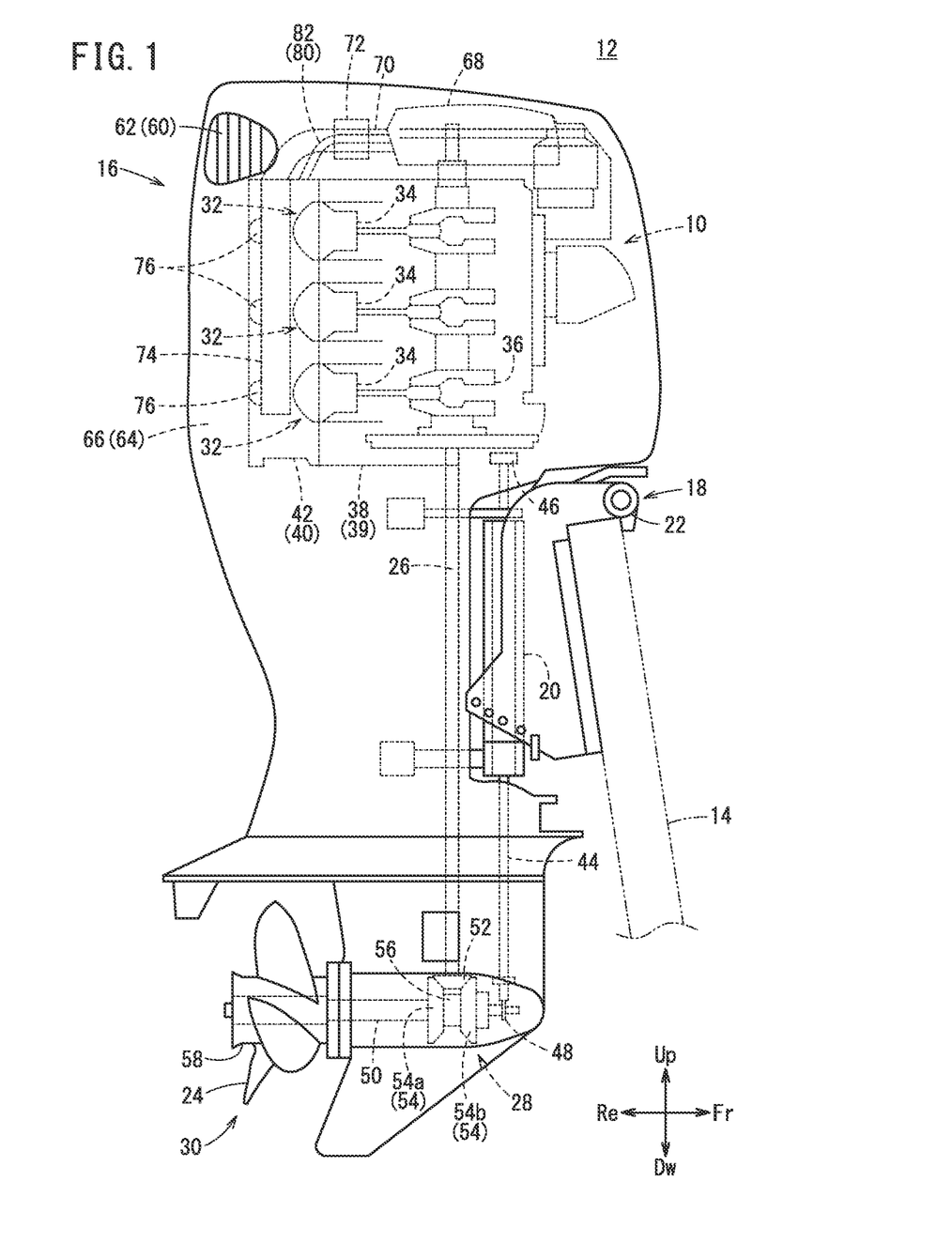
FIG. 1 is a right side view of an outboard motor in which an engine according to the present embodiment is mounted.

An engine (internal combustion engine) 10 according to the present embodiment is applied to, for example, a multi-cylinder engine of an outboard motor 12 as shown in FIG. 1. The outboard motor 12 is attached to a hull 14 as a power source of a small vessel or the like, and is driven under a user's operation to thereby propel the hull 14. The outboard motor 12 includes a cover 16 that houses the components of the outboard motor 12, and an attachment mechanism 18 that fixes the outboard motor 12 to the hull 14 on the front side of the cover 16 (in the forward direction indicated by the arrow Fr).

Figure 2:
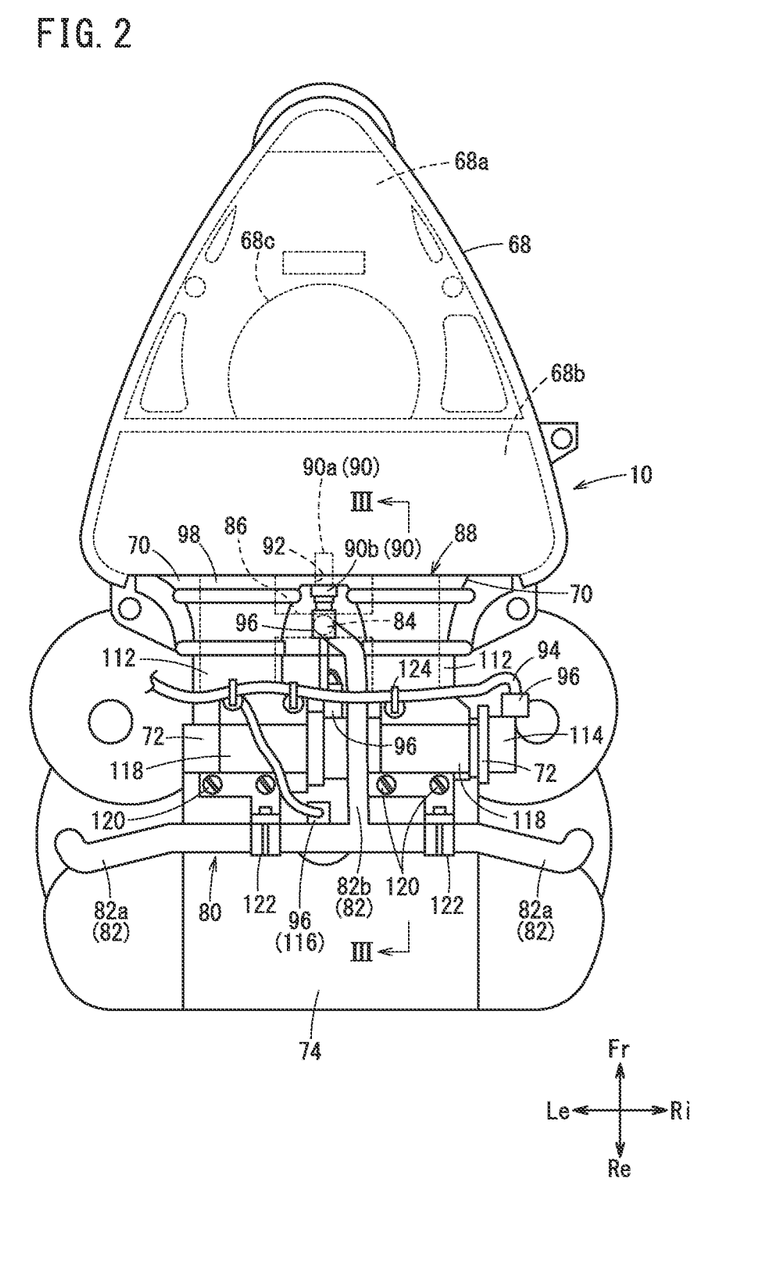
FIG. 2 is a plan view of a main part of the engine shown in FIG. 1.

The attachment mechanism 18 allows the cover 16 to swing to the left and right (the left direction indicated by the arrow Le or the right direction indicated by the arrow Ri in FIG. 2) about a swivel shaft 20 in plan view. The attachment mechanism 18 allows the cover 16 to rotate clockwise or counterclockwise in FIG. 1 about a tilt shaft 22. In the outboard motor 12, in a state in which the up-down direction (the upward direction indicated by the arrow Up or the downward direction indicated by the arrow Dw) of the cover 16 extends substantially in the vertical direction, a propeller (with fins 24) is positioned below the water surface. Hereinafter, the position and direction of the respective components will be described based on the posture of the outboard motor 12 shown in FIG. 1.

A drive shaft 26, a gear mechanism 28, and a propeller mechanism 30 are provided in the cover 16 in addition to the engine 10 according to the present embodiment. The cover 16 forms the exterior of the outboard motor 12.

The outboard motor 12 further includes an exhaust system (not shown) and a cooling structure (not shown). The exhaust system causes exhaust gas from the engine 10 to flow on the lower side of the engine 10. The cooling structure cools the engine 10 and exhaust gas on the lower side of the engine 10. The cooling structure causes water such as seawater or fresh water taken from the outside of the outboard motor 12 to flow as cooling water around the periphery of an exhaust pipe (not shown) through which exhaust gas flows. The cooling structure may have a silencing function of reducing exhaust noise of exhaust gas by causing cooling water to flow.

The engine 10 is a multi-cylinder engine including a plurality of cylinders 32 along the up-down direction of the outboard motor 12 (the cover 16). In the engine 10, the axis line of each cylinder 32 is disposed laterally (substantially horizontally), and a crankshaft 36 connected to a piston rod 34 of each cylinder 32 extends in the up-down direction. Further, a cooling water jacket (not shown) that cools the engine 10 by having the cooling water of a cooling structure flow therethrough is provided on a cylinder head 40 and a cylinder block 39 including a crankcase 38 of the engine 10.

The cylinder head 40 includes a pair of banks 42 (two banks) that alternately house the plurality of cylinders 32 arranged in the up-down direction on the lateral side of the engine 10 (in the rearward direction indicated by the arrow Re). That is, the engine 10 is configured as a V-type engine in which the pair of banks 42 (the plurality of cylinders 32) exhibit a V shape in plan view. In this case, the angle between the pair of banks 42 is not particularly limited, and is set to an appropriate angle so as to promote downsizing of the engine 10 as much as possible. The number of cylinders 32 installed in the engine 10 is not particularly limited as well, and can be set to a number at which a desired driving force (horsepower) can be obtained in the outboard motor 12.

The crankshaft 36 is connected to an upper end of the drive shaft 26. The drive shaft 26 extends in the up-down direction inside the cover 16, and rotates about an axis in accordance with rotation of the crankshaft 36. A lower end of the drive shaft 26 is housed in the gear mechanism 28.

The gear mechanism 28 switches the driving force of the engine 10 under the operation of an operation shaft 44, thereby causing the propeller mechanism 30 to rotate, and causing the hull 14 to move forward or rearward. The operation shaft 44 is rotated, for example, by a shift actuator 46 that is driven in response to a shift operation made by the user.

The gear mechanism 28 causes a shift slider 48 to be advanced and retracted in an axial direction of the propeller mechanism 30 (a propeller shaft 50) by rotation of the operation shaft 44. Consequently, the shift slider 48 moves a dog clutch 56 between a pair of driven bevel gears 54 (a forward driven bevel gear 54*a* and a backward driven bevel gear 54*b*) that mesh with a driving bevel gear 52 connected to the drive shaft 26. Then, the tooth surface of the dog clutch 56 meshes with one of the inner tooth surface of the forward driven bevel gear 54*a* or the inner tooth surface of the backward driven bevel gear 54*b*. Accordingly, the driving force of the engine 10 is transmitted to the propeller mechanism 30 via the dog clutch 56 and the propeller shaft 50.

The propeller mechanism 30 includes: the tubular propeller shaft 50 into which the shift slider 48 is inserted; a tubular body 58 connected to a radially outer side of the propeller shaft 50; and a plurality of fins 24 connected to the outer peripheral surface of the tubular body 58. The propeller mechanism 30 rotates the respective fins 24 clockwise or counterclockwise about the propeller shaft 50 that is rotated by the gear mechanism 28, thereby causing the hull 14 to move forward or backward.

The outboard motor 12 is provided with an intake structure 60 that takes in air used for combustion of fuel in the engine 10. The intake structure 60 includes an air intake port portion 62 formed in the upper part of the cover 16, and an intake path 64 that communicates with the air intake port portion 62, and causes air to flow in the cover 16.

A pair of the air intake port portions 62 are provided on the rear side of the cover 16, on both sides thereof in the width direction. A louver such as a net or a lattice that suppresses inflow of foreign matter such as water other than air into the intake path 64 is attached to each air intake port portion 62.

The intake path 64 is configured to introduce air (intake air) into the intake pipe portions 70 of the engine 10 via a silencer 68 disposed above the engine 10 after allowing air to flow through a rear space 66 formed rearward of the engine 10 in the cover 16. Specifically, the rear space 66 directly communicates with the air intake port portions 62 at the rear of the engine 10, and is formed in the up-down direction. In this case, the air having flowed into the rear space 66 from the air intake port portions 62 once flows downward, and then flows upward. Accordingly, air flows in the entire rear space 66.

The silencer 68 that suppresses air noise (intake noise) during intake, and the pair of intake pipe portions 70 (two intake pipe portions) that connect the silencer 68 and the pair of banks 42, are disposed above the engine 10. The air that has flowed upward is taken into the silencer 68, and flows into the pair of banks 42 via the pair of intake pipe portions 70.

Figure 3:
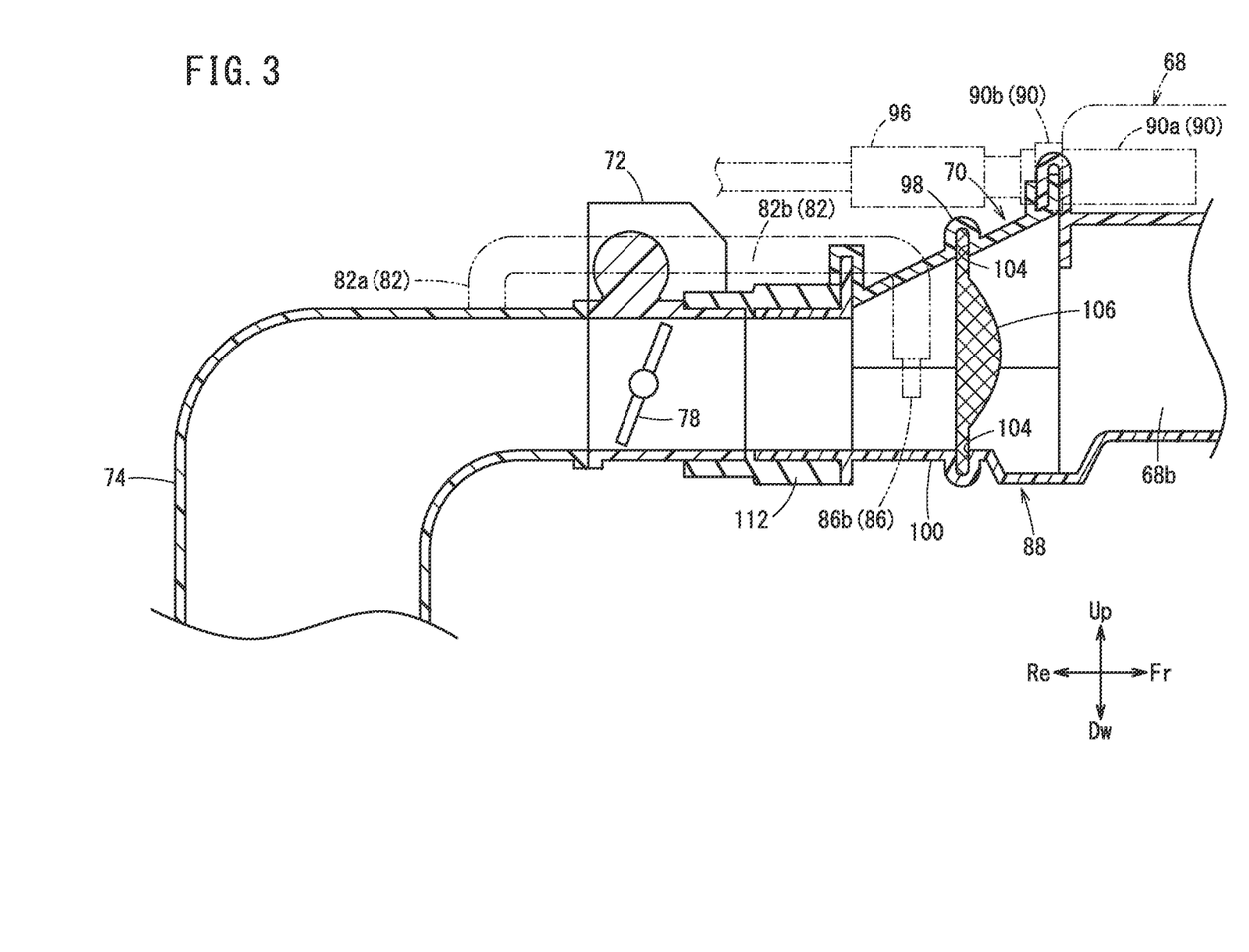
FIG. 3 is a cross-sectional view taken along line III-III of FIG. 2.

As described above, the engine 10 is a V-type engine in which the pair of banks 42 exhibit a V shape in plan view. The pair of intake pipe portions 70 are formed in a shape capable of supplying air to the respective cylinders 32 in the pair of banks 42. Specifically, as shown in FIGS. 1 to 3, the pair of intake pipe portions 70, throttle bodies 72 (throttles), an inlet manifold 74, and a plurality of intake ports 76 connected to the respective cylinders 32, are provided in this order from the silencer 68 toward the respective cylinders 32.

The pair of intake pipe portions 70 are provided on both left and right sides of the engine 10. The upstream sides of the pair of intake pipe portions 70 are connected to the silencer 68. The throttle body 72 that incorporates therein a throttle valve 78 is connected to the downstream side of each intake pipe portion 70. Therefore, the pair of intake pipe portions 70 cause the air in which the intake noise is suppressed by the silencer 68 to flow toward the inlet manifold 74 in accordance with the opening degree of the throttle valve 78. The inlet manifold 74 is provided in the up-down direction, for example, at the rear of the pair of banks 42, and supplies air flowing from the pair of intake pipe portions 70 via the throttle bodies 72, to the respective intake ports 76 of the pair of banks 42.

The plurality of intake ports 76 constitute an inner intake system of the engine 10. The inner intake system supplies air into the cylinders 32 from the inside of the pair of banks 42. The air intake ports 76 extend in a direction perpendicular to the direction of extension of the inlet manifold 74, and are connected to the respective cylinders 32. Specifically, the intake ports 76 alternately extend from the inlet manifold 74 along the up-down direction of the engine 10, for example, extend while curving inward in the width direction of the inlet manifold 74 toward the front side, and are wrapped around to the inner side in the central portion in the width direction, whereby the air intake ports 76 are connected to corresponding ones of the cylinders 32. The arcuate shape of the respective air intake ports 76 is set to an appropriate curvature that enables the air to flow smoothly.

2. Characteristic Configuration of Present Embodiment

The outboard motor 12 including the engine 10 according to the present embodiment is basically configured as described above. Next, a characteristic configuration of the engine 10 according to the present embodiment will be described. The characteristic configuration of the engine 10 according to the present embodiment relates to a blow-by gas recirculation path 80 that guides (recirculates) blow-by gas from the cylinder head 40 including the pair of banks 42 or the crankcase 38 to the pair of intake pipe portions 70. The configuration of the engine 10 around the blow-by gas recirculation path 80 that mainly recirculates blow-by gas from the cylinder head 40 to the intake pipe portions 70 will be described with reference to FIGS. 1 to 8.

Blow-by gas flows from a combustion chamber (not shown) into the crank chamber through a gap between the cylinder and the piston. The engine 10 is provided with the blow-by gas recirculation path 80 for recirculating the blow-by gas as intake gas from the crank chamber to the combustion chamber. Specifically, the blow-by gas recirculation path 80 includes: a breather tube 82 that extends upwardly from the pair of banks 42 to cause the blow-by gas to flow out from the cylinder head 40; a breather tube attachment portion 84 which is provided on the silencer 68, and into which the distal end portion of the breather tube 82 is inserted; and a distribution passage 86 which is provided integrally with the silencer 68, and allows the blow-by gas flowing through the breather tube 82 to be distributed to flow into the pair of intake pipe portions 70.

The breather tube 82 is formed of: a pair of first tubes 82a extending upward from the pair of banks 42 and connected to each other above the inlet manifold 74; and a second tube 82b extending forward from a connection point between the pair of first tubes 82a, and having a distal end portion inserted into the breather tube attachment portion 84. Note that, when blow-by gas is recirculated to the intake pipe portions 70 from the crankcase 38 instead of the pair of banks 42, the breather tube 82 is a single tube extending from the crankcase 38 to cause the blow-by gas to flow out from the crankcase 38 to the intake pipe portions 70, and the distal end portion of the breather tube 82 is inserted into the breather tube attachment portion 84.

Figure 4:
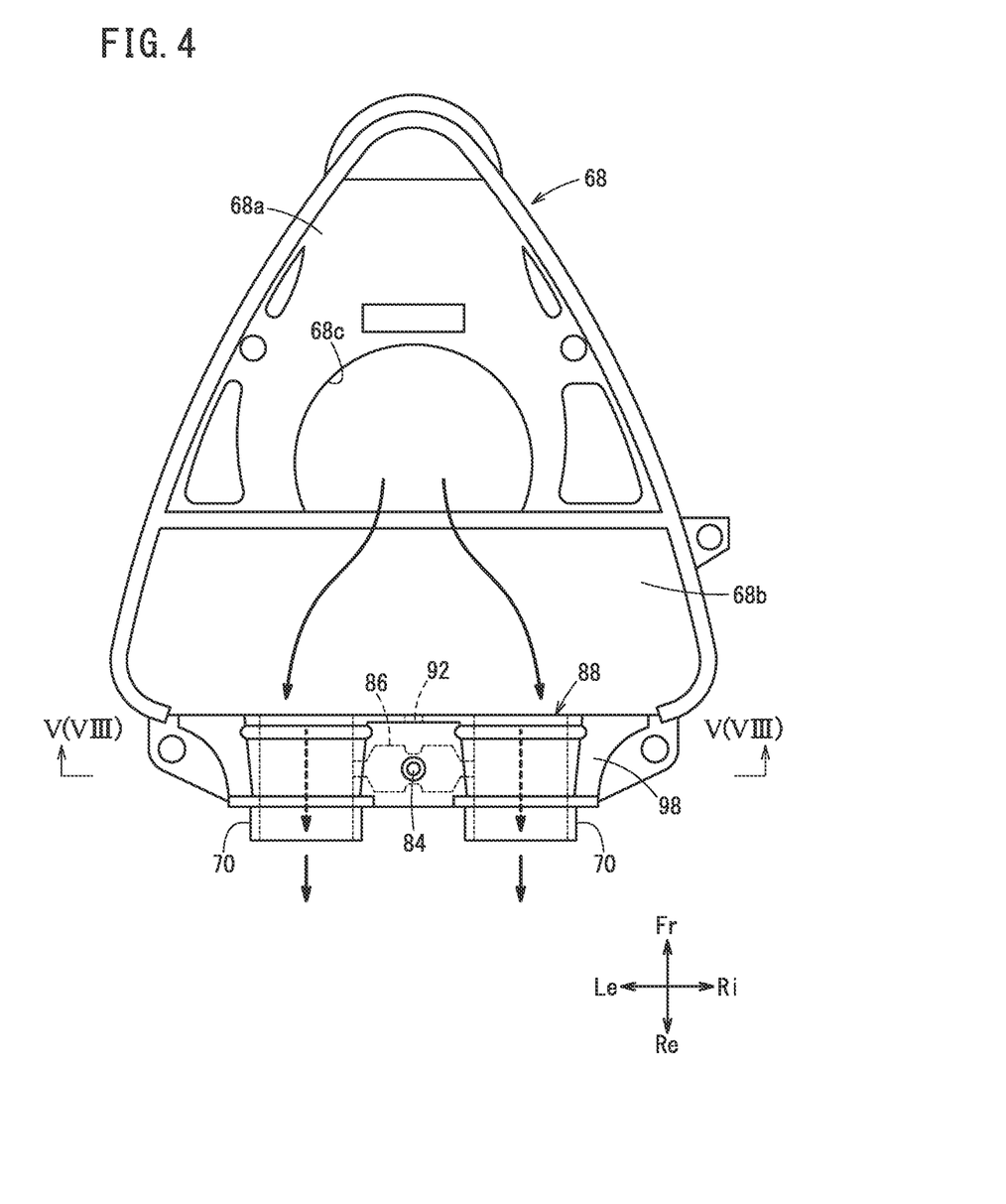
FIG. 4 is a plan view of a main part of a silencer.
Figure 5:
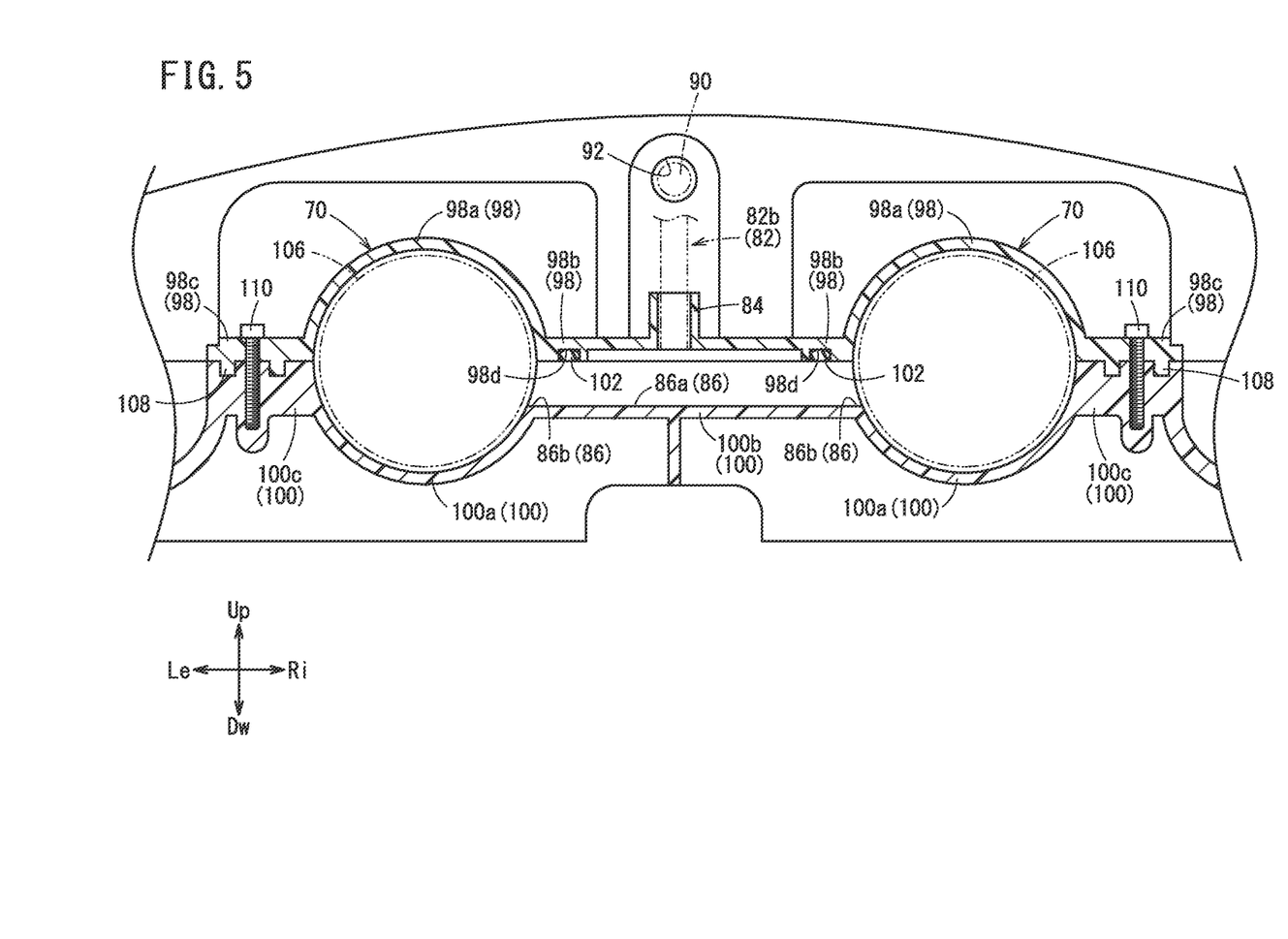
FIG. 5 is a cross-sectional view taken along line V-V of FIG. 4.
Figure 6:
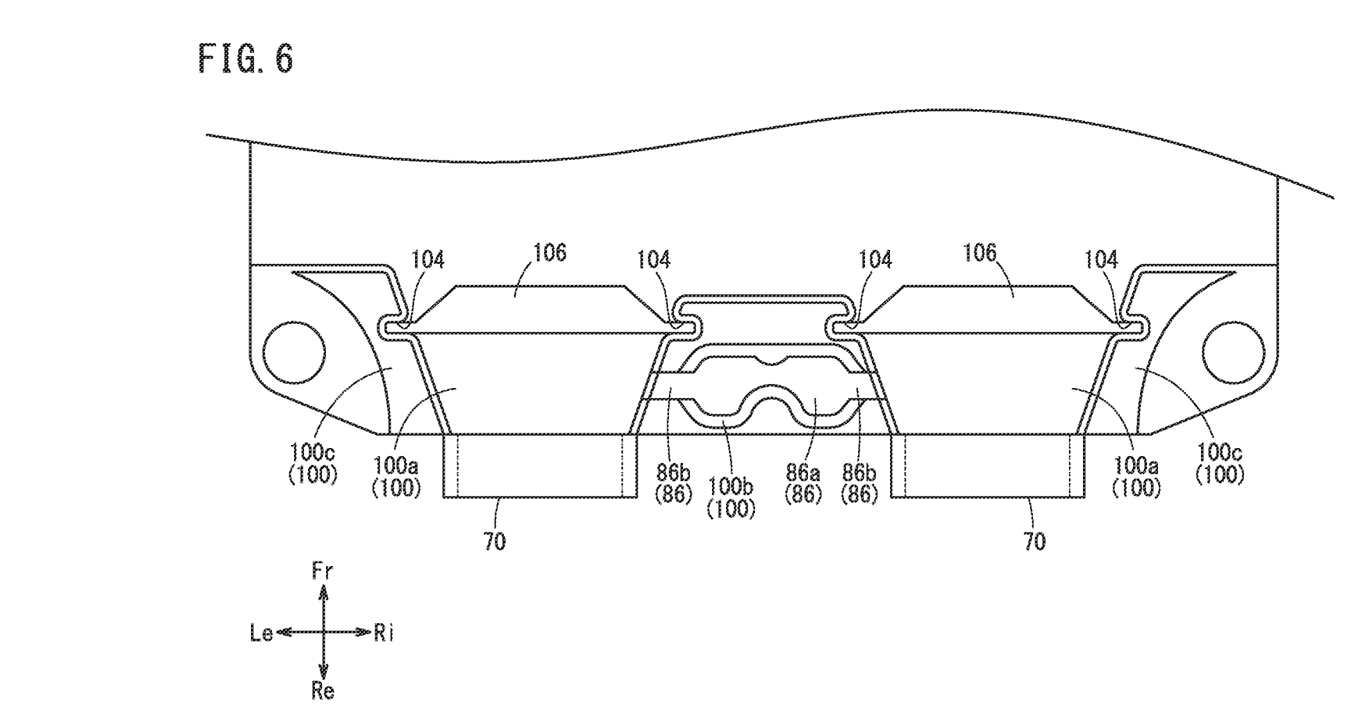
FIG. 6 is a plan view of the periphery of a distribution passage.
Figure 7:
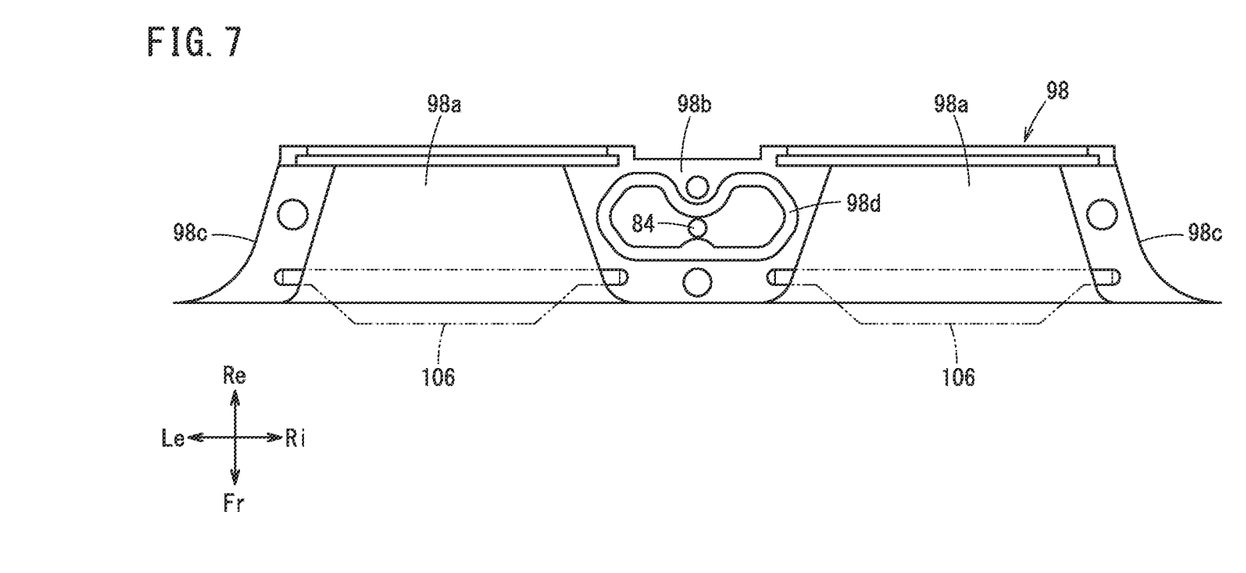
FIG. 7 is a bottom view of an upper member.

The silencer 68 is disposed above the engine 10, and is a hollow member having a substantially triangular shape that tapers toward the front in the plan view of FIGS. 2 and 4. The silencer 68 includes: an air guide portion 68a that is provided on the front side and takes in air from the rear space 66; and a chamber portion 68b that is provided on the rear side and temporarily stores the intake air taken in by the air guide portion 68a and supplies the temporarily stored intake air to the pair of intake pipe portions 70.

A plurality of openings 68c communicating with the rear space 66 are formed in the bottom portion of the air guide portion 68a of the silencer 68. Accordingly, the air guide portion 68a can take in air from the rear space 66 via the openings 68c, and cause the air that has been taken in to flow to the chamber portion 68b located on the rear side.

The pair of tubular intake pipe portions 70 communicating with the chamber portion 68b and protruding rearward are provided on both left and right sides of a rear portion of the silencer 68. That is, the pair of intake pipe portions 70 are formed integrally with the silencer 68 along the front-rear direction. Accordingly, a communication portion where the chamber portion 68b communicate with the pair of intake pipe portions 70 is configured as a branch unit 88 that allows the air in which the intake noise is suppressed by the silencer 68 to branch to flow from the chamber portion 68b into the pair of intake pipe portions 70.

An intake air temperature sensor 90 is disposed at an intermediate position between the pair of intake pipe portions 70 in an upper part of the rear portion of the silencer 68. The intake air temperature sensor 90 detects the temperature of air (intake air temperature) in the chamber portion 68b. That is, a sensor attachment hole 92 opens in the front-rear direction at the intermediate position in the upper part of the rear portion of the silencer 68. In this case, the intake air temperature sensor 90 is disposed along the front-rear direction of the engine 10 and along the pair of intake pipe portions 70 such that a sensing portion 90a that detects the intake air temperature is located in the chamber portion 68b (inside the silencer 68), and a coupler portion 90b connected to a connector 96 of a harness 94 is located rearward (outward) of the silencer 68.

The upper part of the rear portion of the silencer 68 opens so as to cut out the upstream side of the pair of intake pipe portions 70. This opening portion is closed by an upper member 98. Specifically, the upper member 98 is formed of: left and right arc-shaped portions 98a constituting parts of the pair of intake pipe portions 70; a connecting portion 98b that connects the left and right arc-shaped portions 98a; and two flange portions 98c extending outward (in the left-right direction) from the left and right arc-shaped portions 98a.

On the other hand, a lower part of the rear portion of the silencer 68 is configured as a lower member 100 corresponding to the upper member 98. Specifically, the lower member 100 is formed of: two arc-shaped portions 100a facing the two arc-shaped portions 98a of the upper member 98 and constituting parts of the pair of intake pipe portions 70; a connecting portion 100b facing the connecting portion 98b of the upper member 98 and connecting the two arc-shaped portions 100a; and two flange portions 100c facing the two flange portions 98c of the upper member 98 and extending outward (in the left-right direction) from the two arc-shaped portions 100a.

Therefore, by fitting the upper member 98 and the lower member 100 to each other, the pair of intake pipe portions 70 are formed.

In this case, a chamber 86a and cutout portions 86b (communication portion) are formed in the connecting portion 100b of the lower member 100. The chamber 86a is formed along the left-right direction. The cutout portions 86b are formed by cutting out a part of the connecting portion 100b, extend in the left-right direction from the chamber 86a, and communicate with the pair of intake pipe portions 70. The chamber 86a is formed by being surrounded with a wall portion at the intermediate position between the pair of intake pipe portions 70. Oil in the engine 10 is stored in the chamber 86a. Further, the chamber 86a and the two cutout portions 86b are formed substantially symmetrically with respect to the intermediate position.

On the other hand, the tubular breather tube attachment portion 84 into which the distal end portion of the second tube 82b is inserted is formed in the connecting portion 98b of the upper member 98, so as to protrude in the up-down direction. In this case, the breather tube attachment portion 84 is provided below the sensor attachment hole 92 and at the center position of the connecting portion 98b. Thus, as shown in FIG. 2, the intake air temperature sensor 90 and the distal end portion of the second tube 82b overlap each other in plan view. Further, as shown in FIG. 3, the intake air temperature sensor 90 and the second tube 82b are disposed at different height positions. In addition, a fitting groove 98d is formed in the bottom portion of the connecting portion 98b. When the upper member 98 and the lower member 100 are fitted to each other, the fitting groove 98d surrounds the chamber 86a in plan view. A seal member 102 is fitted into the fitting groove 98d.

Therefore, when the bottom surface of the upper member 98 and the upper surface of the lower member 100 are fitted to each other, the distribution passage 86 that allows the second tube 82b (the breather tube attachment portion 84) to communicate with the pair of intake pipe portions 70 is formed by the bottom portion of the connecting portion 98b of the upper member 98, the chamber 86a, and the two cutout portions 86b. That is, the distribution passage 86 distributes the blow-by gas flowing into the distribution passage 86 through the second tube 82b, to the left and right, and recirculates the blow-by gas that has been distributed to the left and right, to the pair of intake pipe portions 70 via the two cutout portions 86b. In this case, the distribution passage 86 is formed substantially symmetrically at the intermediate position between the pair of intake pipe portions 70, and as a result, the blow-by gas can be uniformly distributed to flow into the pair of intake pipe portions 70. In addition, by fitting the bottom surface of the upper member 98 and the upper surface of the lower member 100 to each other, the periphery of the chamber 86a in the two connecting portions 98b and 100b can be sealed by the seal member 102.

Figure 8:
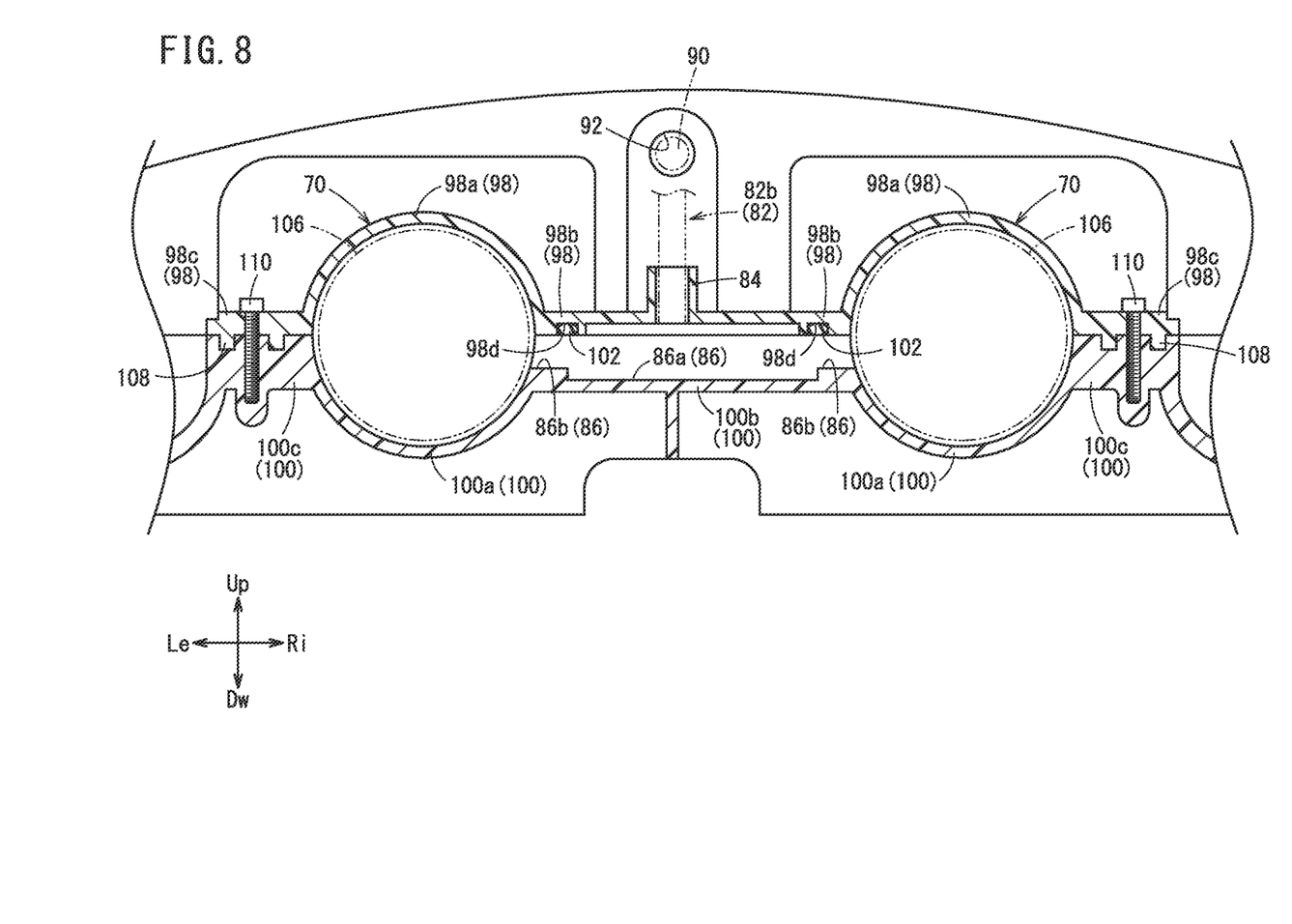
FIG. 8 is a cross-sectional view of a modification taken along line VIII-VIII of FIG. 4.

Note that the seal member 102 is preferably interposed between the two connecting portions 98b and 100b. Therefore, it is preferable that the fitting groove 98d is formed in one of the connecting portions 98b and 100b. Further, it is preferable that the breather tube attachment portion 84 communicates with the distribution passage 86. Therefore, as shown in FIGS. 2, 4, 5 and 7, the breather tube attachment portion 84 is formed at the intermediate position between the pair of intake pipe portions 70 in the connecting portion 98b of the upper member 98. Alternatively, the breather tube attachment portion 84 may be formed at a position shifted in the left-right direction from the intermediate position. Further, as shown in FIG. 8, the chamber 86a may be formed to be deeper in the downward direction than the two cutout portions 86b. As a result, the oil in the engine 10 can be reliably stored in the chamber 86a.

Moreover, arc-shaped grooves 104 are formed in the upper member 98 and the lower member 100, upstream (frontward) of the two cutout portions 86b (the distribution passage 86) in the pair of intake pipe portions 70. Frame traps 106 are fitted into these grooves 104 so as to block the pair of intake pipe portions 70. As a result, when air flows from the chamber portion 68b to the pair of intake pipe portions 70, foreign matter contained in the air can be captured by the frame traps 106.

Further, labyrinth structures 108 are provided on the bottom portions of the flange portions 98c of the upper member 98 and the upper surfaces of the flange portions 100c of the lower member 100. The flange portions 100c of the lower member 100 are fitted to the flange portions 98c of the upper member 98. Accordingly, it is possible to prevent air or the like flowing through the pair of intake pipe portions 70 from leaking to the outside. The flange portions 98c and 100c are fastened and fixed in the up-down direction by screw members 110.

Further, connecting portions between the pair of intake pipe portions 70 and the pair of throttle bodies 72 are hermetically sealed by connecting members 112 such as grommets. The inlet manifold 74 is connected to the downstream side of the throttle bodies 72.

Further, various sensors that detect the condition of the engine are disposed near the pair of throttle bodies 72 and the distribution passage 86 between the pair of intake pipe portions 70. Specifically, the intake air temperature sensor 90 is attached to the rear portion of the silencer 68. Further, a throttle sensor 114 that detects an opening degree of the throttle valve 78 is attached to the throttle body 72. Furthermore, a negative pressure sensor 116 that detects the pressure in the inlet manifold 74 is disposed above the inlet manifold 74. These sensors are connected via the connectors 96 and the harnesses 94 to an electronic control device (not shown) that controls the entire outboard motor 12.

The two throttle bodies 72 are attached to the engine 10 via holders 118 and screw members 120. Further, the pair of first tubes 82a are held by holding members 122, such as binding bands or the like, provided on the holders 118. The harnesses 94 are held by holding members 124, such as binding bands or the like, provided on the holders 118.

3. Effect of Present Embodiment

As described above, the engine 10 (internal combustion engine) according to the present embodiment is an internal combustion engine including the two intake pipe portions 70 that guide air (intake air) to the two banks 42, and the blow-by gas recirculation path 80 that guides blow-by gas from the cylinder head 40 including the two banks 42 or from the crankcase 38 to the two intake pipe portions 70. In this case, the blow-by gas recirculation path 80 includes the distribution passage 86 that is provided between the two intake pipe portions 70 and allows the blow-by gas to be distributed to flow into the two intake pipe portions 70.

Thus, the blow-by gas can be uniformly distributed to flow into the two banks 42 from the distribution passage 86 via the two intake pipe portions 70. As a result, occurrence of a combustion difference in the cylinder between the two banks 42 is suppressed, and the performance of the engine 10 can be improved. In addition, by providing the distribution passage 86 between the two intake pipe portions 70, the blow-by gas recirculation path 80 can be compactly disposed. As a result, cost reduction and weight reduction of the engine 10 can be realized.

Here, the engine 10 further includes a silencer 68 that is connected to the upstream sides of the two intake pipe portions 70 and suppresses intake noise, and a branch unit 88 that is provided in the silencer 68 and allows the air in which intake noise is suppressed to branch to flow into the two intake pipe portions 70. The distribution passage 86 and the branch unit 88 are formed integrally with the silencer 68. This makes it unnecessary to separately provide a member (pipe) for distributing the blow-by gas to the two intake pipe portions 70. As a result, it is possible to realize a reduction in the number of components of the engine 10 and an improvement in working efficiency of mounting the blow-by gas recirculation path 80.

In this case, the distribution passage 86 is formed substantially symmetrically with respect to an intermediate position between the two intake pipe portions 70. In this way, the distribution passage 86 has substantially the same shape (same structure) in the left-right direction with respect to the intermediate position, and there is no left-right difference. Accordingly, it is possible to further suppress the occurrence of a combustion difference in the cylinder between the two banks 42.

At least portions of the silencer 68 that are the distribution passage 86 and the branch unit 88 are formed by fitting the upper member 98 and the lower member 100 to each other. Thus, the distribution passage 86 and the branch unit 88 can be easily formed.

Further, the chamber 86a that holds oil in the engine 10 is formed in the distribution passage 86. As a result, oil is prevented from flowing out to the outside and to the surrounding members such as the silencer 68, and thus the marketability of the engine 10 is improved.

Further, the seal member 102 that surrounds the periphery of the chamber 86a is interposed between the upper member 98 and the lower member 100. As a result, oil can be prevented from leaking out from the gap between the upper member 98 and the lower member 100. Even if oil flows out from the chamber 86a, the oil flows in the engine 10. Therefore, the oil can be prevented from leaking to the silencer 68 when the cover 16 rotates about the tilt shaft 22.

The fitting groove 98d into which the seal member 102 is fitted is formed in the upper member 98 or the lower member 100. As a result, the seal member 102 can be easily incorporated into the upper member 98 without the seal member 102 being displaced.

Further, the chamber 86a may be formed to be deeper than the cutout portions 86b that are communication portions of the distribution passage 86 that communicate with the two intake pipe portions 70. This makes it easier for oil to accumulate in the chamber 86a, so that it is possible to reliably prevent oil from dripping.

Further, the cutout portions 86b that are portions of the distribution passage 86 and communicate with the two intake pipe portions 70 are formed in the lower member 100. Thus, the distribution passage 86 can be easily formed.

Further, a joint portion between the upper member 98 and the lower member 100 has the labyrinth structure 108. As a result, air is unlikely to leak from the joint portion.

Further, the silencer 68 includes the air guide portion 68a that takes in air, and the chamber portion 68b that supplies, to the branch unit 88, the air taken in by the air guide portion 68a. The intake air temperature sensor 90 that detects the temperature of air (intake air temperature) is disposed in the chamber portion 68b, at the intermediate position between the two intake pipe portions 70. This makes it possible to reduce a detection difference of the intake air temperature between the two banks 42. As a result, excessive fuel injection or the like is suppressed. This can contribute to improvement in economic efficiency and marketability of the engine 10.

Further, the intake air temperature sensor 90 that detects the intake air temperature is disposed in the silencer 68, at the intermediate position between the two intake pipe portions 70, the intake air temperature sensor 90 being disposed along the front-rear direction of the engine 10 and along the two intake pipe portions 70 such that the sensing portion 90a is located inside the silencer 68 and the coupler portion 90b is located outside the silencer 68. As a result, even in a state where the coupler portion 90b of the intake air temperature sensor 90 is connected to the connector 96, the intake air temperature sensor 90 can be accommodated in the configuration space of the silencer 68. Further, the sensing portion 90a faces forward, and therefore the intake air temperature sensor 90 can be prevented from being exposed to water during tilt-up in which the cover 16 rotates clockwise about the tilt shaft 22. As a result, the toughness against water can be improved.

The engine 10 further includes the two throttle bodies 72 (throttles) respectively disposed in the two intake pipe portions 70, on the downstream side of the distribution passage 86. In this case, sensors (the intake air temperature sensor 90, the throttle sensor 114, and the negative pressure sensor 116) that detect the condition of the engine 10 are disposed near the two throttle bodies 72 and the distribution passage 86 between the two intake pipe portions 70. Thus, the space above the engine 10 can be effectively utilized. In addition, it is possible to improve the assemblability of the connectors 96 with respect to the various sensors.

The blow-by gas recirculation path 80 further includes: the breather tube 82 that extends from the two banks 42 to allow the blow-by gas to flow out from the cylinder head 40 or extends from the crankcase 38 to allow the blow-by gas to flow out from the crankcase 38; and the breather tube attachment portion 84 which protrudes outward from the distribution passage 86 and into which the distal end portion of the breather tube 82 is inserted. The blow-by gas recirculation path 80 is formed only by inserting the breather tube 82 into the breather tube attachment portion 84. Thus, the blow-by gas recirculation path 80 can be easily assembled to the engine 10.

The engine 10 further includes the two frame traps 106 respectively provided on the upstream sides of the two intake pipe portions 70. The distribution passage 86 is provided on the downstream sides of the two frame traps 106 in the two intake pipe portions 70. Thus, the blow-by gas can be recirculated to the air from which foreign matter has been removed by the frame traps 106. In addition, by providing the frame traps 106 on the upstream side of the distribution passage 86, it is possible to prevent oil from adhering to the frame traps 106. Thus, the blow-by gas can be recirculated to the clean air.

The engine 10 is a multi-cylinder engine of the outboard motor 12. Therefore, it is possible to appropriately cope with the inclination in the front-rear direction and the left-right direction specific to the outboard motor 12.

It should be noted that the present invention is not limited to the embodiment described above, and it goes without saying that various configurations could be adopted therein on the basis of the descriptive content of the present specification.

The invention claimed is:

1. An internal combustion engine comprising:
   two intake pipe portions configured to guide intake air to two banks;
   a blow-by gas recirculation path configured to guide blow-by gas from a cylinder head including the two banks or from a crankcase to the two intake pipe portions;
   a silencer connected to upstream sides of the two intake pipe portions and configured to suppress intake noise; and
   a branch unit provided on a downstream side of the silencer and configured to allow intake air in which the intake noise is suppressed to branch to flow into the two intake pipe portions,
   wherein the blow-by gas recirculation path includes a distribution passage provided between the two intake pipe portions on the downstream side of the silencer and configured to allow the blow-by gas to be distributed to flow into the two intake pipe portions.

2. The internal combustion engine according to claim 1, wherein the distribution passage and the branch unit are formed integrally with the silencer.

3. The internal combustion engine according to claim 2, wherein the distribution passage is formed substantially symmetrically with respect to an intermediate position between the two intake pipe portions.

4. The internal combustion engine according to claim 2, wherein
at least portions of the silencer that are the distribution passage and the branch unit are formed by fitting an upper member and a lower member to each other.

5. The internal combustion engine according to claim 4, wherein
a chamber configured to hold oil in the internal combustion engine is formed in the distribution passage.

6. The internal combustion engine according to claim 5, wherein
a seal member that surrounds a periphery of the chamber is interposed between the upper member and the lower member.

7. The internal combustion engine according to claim 6, wherein
a fitting groove into which the seal member is fitted is formed in the upper member or the lower member.

8. The internal combustion engine according to claim 5, wherein
the chamber is formed to be deeper than a communication portion of the distribution passage that communicates with each of the two intake pipe portions.

9. The internal combustion engine according to claim 4, wherein
a cutout portion that is a portion of the distribution passage and communicates with each of the two intake pipe portions is formed in the lower member.

10. The internal combustion engine according to claim 4, wherein
a joint portion between the upper member and the lower member has a labyrinth structure.

11. The internal combustion engine according to claim 2, wherein
the silencer includes an air guide portion configured to take in the intake air, and a chamber portion configured to supply, to the branch unit, the intake air taken in by the air guide portion, and
an intake air temperature sensor configured to detect a temperature of the intake air is disposed in the chamber portion, at an intermediate position between the two intake pipe portions.

12. The internal combustion engine according to claim 2, wherein
an intake air temperature sensor configured to detect a temperature of the intake air is disposed in the silencer, at an intermediate position between the two intake pipe portions, the intake air temperature sensor being disposed along a front-rear direction of the internal combustion engine and along the two intake pipe portions in a manner that a sensing portion of the intake air temperature sensor is located inside the silencer and a coupler portion thereof is located outside the silencer.

13. The internal combustion engine according to claim 1, further comprising two throttles respectively disposed in the two intake pipe portions, on a downstream side of the distribution passage, wherein
sensors configured to detect a condition of the internal combustion engine are disposed near the two throttles and the distribution passage between the two intake pipe portions.

14. The internal combustion engine according to claim 1, wherein
the blow-by gas recirculation path further includes: a breather tube that extends from the two banks to allow the blow-by gas to flow out from the cylinder head or extends from the crankcase to allow the blow-by gas to flow out from the crankcase; and a breather tube attachment portion which protrudes outward from the distribution passage and into which a distal end portion of the breather tube is inserted.

15. The internal combustion engine according to claim 1, further comprising two frame traps respectively provided on upstream sides of the two intake pipe portions, wherein
the distribution passage is provided on downstream sides of the two frame traps in the two intake pipe portions.

16. The internal combustion engine according to claim 1, wherein
the internal combustion engine is a multi-cylinder engine of an outboard motor.

* * * * *